Dec. 31, 1946.  B. W. FRY  2,413,304
VENDING MACHINE
Original Filed May 5, 1941   8 Sheets-Sheet 1
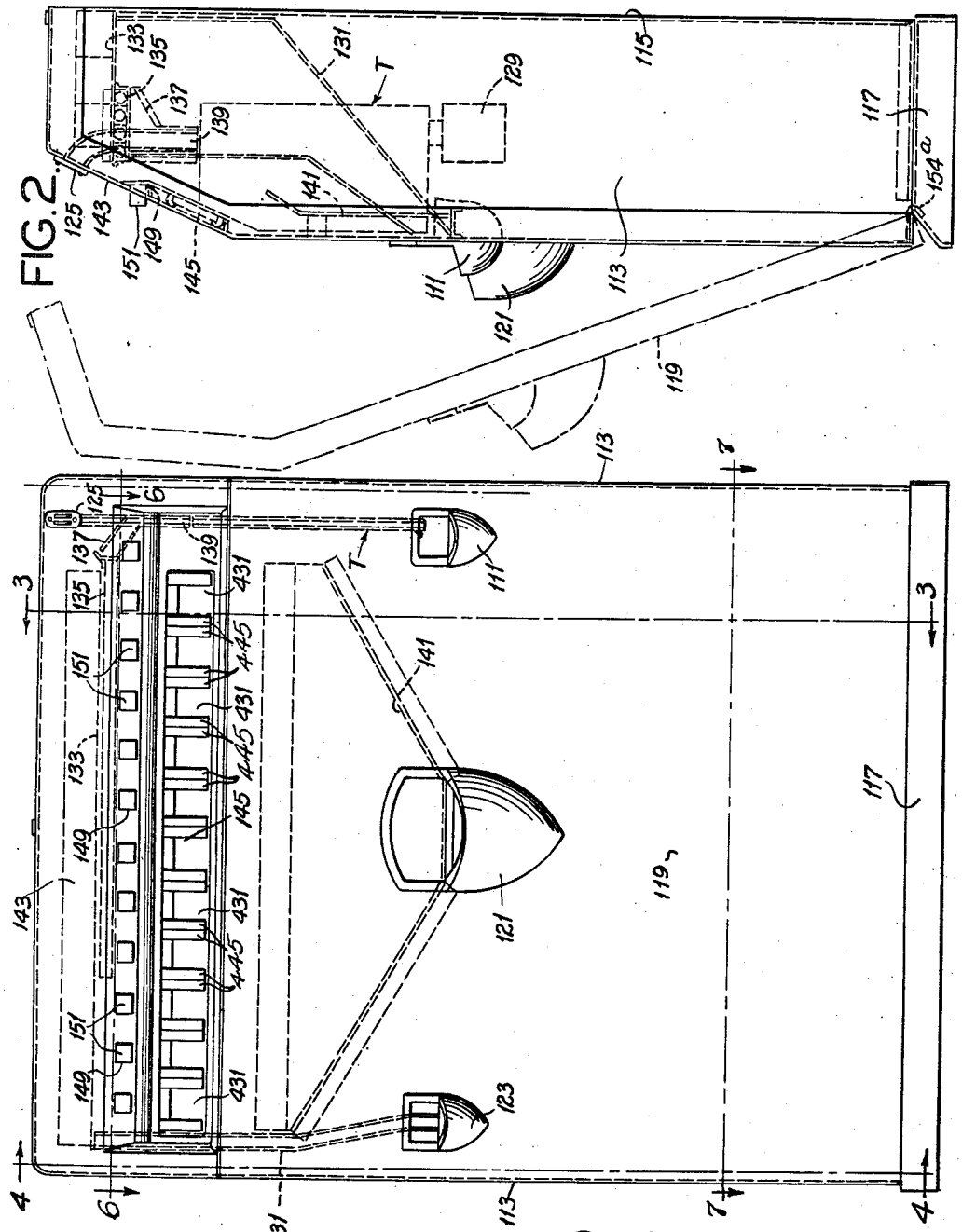

Dec. 31, 1946.  B. W. FRY  2,413,304
VENDING MACHINE
Original Filed May 5, 1941  8 Sheets-Sheet 2

Benjamin W. Fry
Inventor.
Haynes and Koenig
Attorneys.

Dec. 31, 1946. B. W. FRY 2,413,304
VENDING MACHINE
Original Filed May 5, 1941 8 Sheets-Sheet 4

Benjamin W. Fry,
Inventor.
Haynes and Koenig
Attorneys.

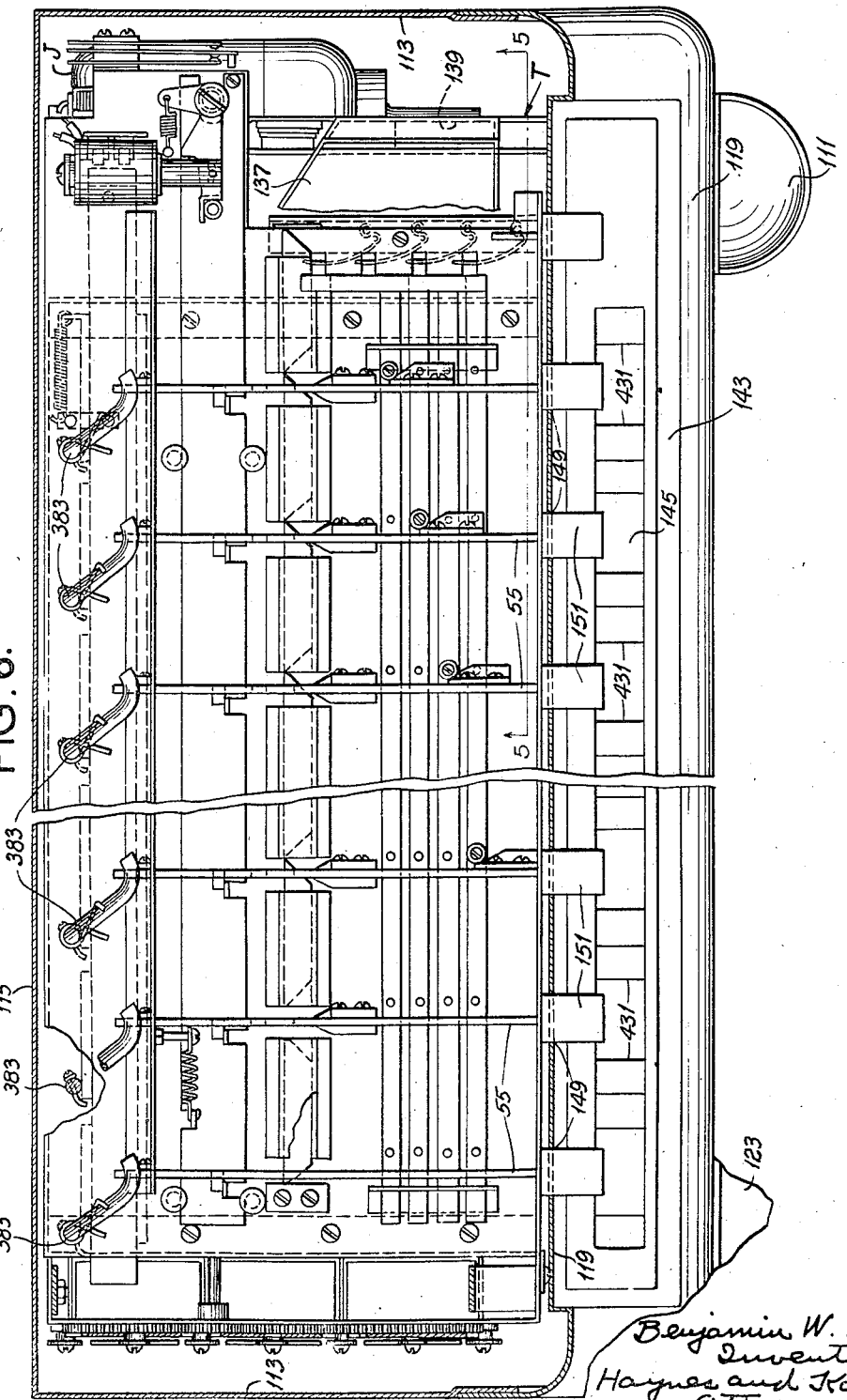

Dec. 31, 1946.        B. W. FRY         2,413,304
VENDING MACHINE
Original Filed May 5, 1941    8 Sheets-Sheet 6

Dec. 31, 1946.  B. W. FRY  2,413,304
VENDING MACHINE
Original Filed May 5, 1941    8 Sheets-Sheet 7
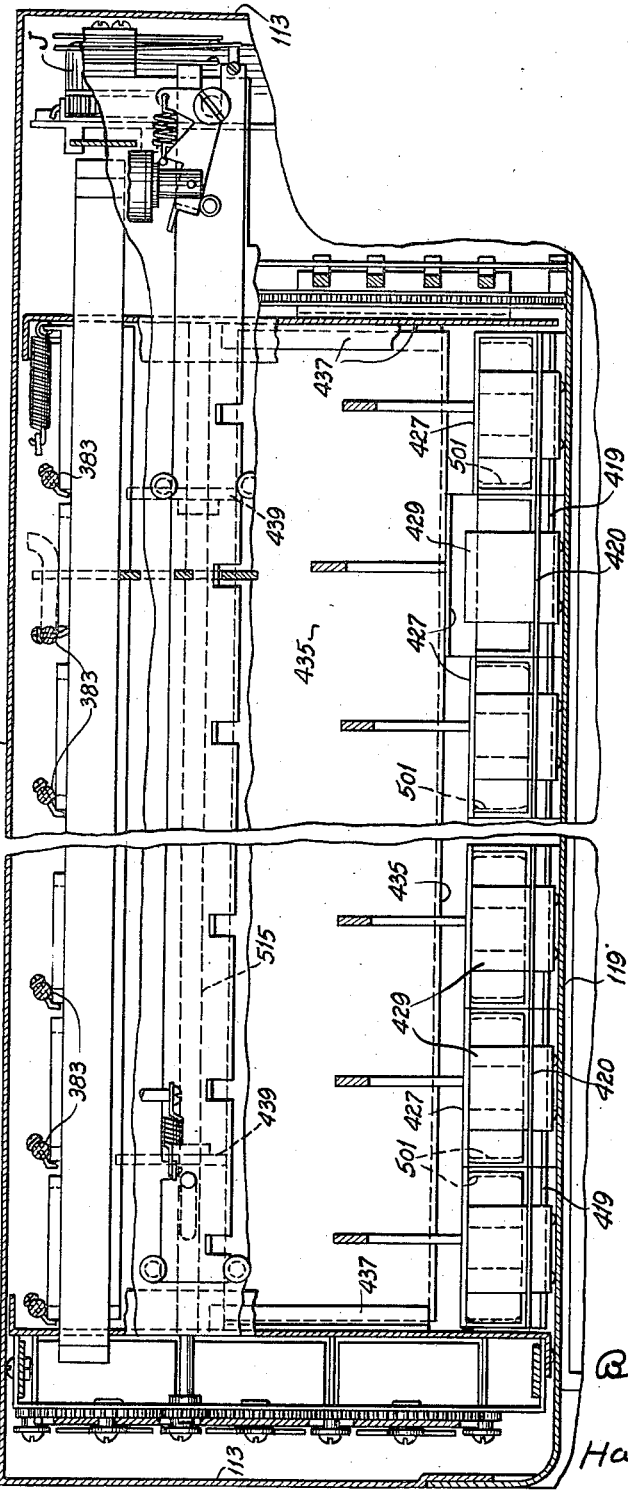

Dec. 31, 1946.  B. W. FRY  2,413,304
VENDING MACHINE
Original Filed May 5, 1941  8 Sheets-Sheet 8

Benjamin W. Fry,
Inventor.
Haynes and Koenig,
Attorneys.

Patented Dec. 31, 1946

2,413,304

UNITED STATES PATENT OFFICE 2,413,304

VENDING MACHINE

Benjamin W. Fry, University City, Mo., assignor to National Vendors, Inc., St. Louis, Mo., a corporation of Missouri Original application May 5, 1941, Serial No. 391,907. Divided and this application September 30, 1944, Serial No. 556,540

11 Claims. (Cl. 312—65)

1

This invention relates to vending machines generally, and with regard to certain more specific features, to vending machines for cigarette packages and the like.

The invention is a division of that disclosed in my United States patent application Serial No. 391,907, filed May 5, 1941, for Vending machine, eventuated as Patent No. 2,377,413, the divisional subject-matter being that directed to the package delivery means.

Among the several objects of the invention may be noted the provision in a vending machine of the class described of a compact, relatively simple arrangement having a large capacity for cigarette packages, including all packages of all popular size and price and including both standard and long lengths of twenty-cigarette and twenty-four-cigarette packages and the provision of apparatus of the class described which may easily be reloaded and serviced. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments, Fig. 1 is a front elevation on a reduced scale;

Fig. 2 is a side elevation showing in dotted lines a partially removed position of a front panel;

Fig. 6 is a horizontal section taken on line 6—6 of Fig. 1;

Fig. 8 is a view similar to Fig. 6, but showing additional parts removed and an ultimate position of parts;

Figure 3:
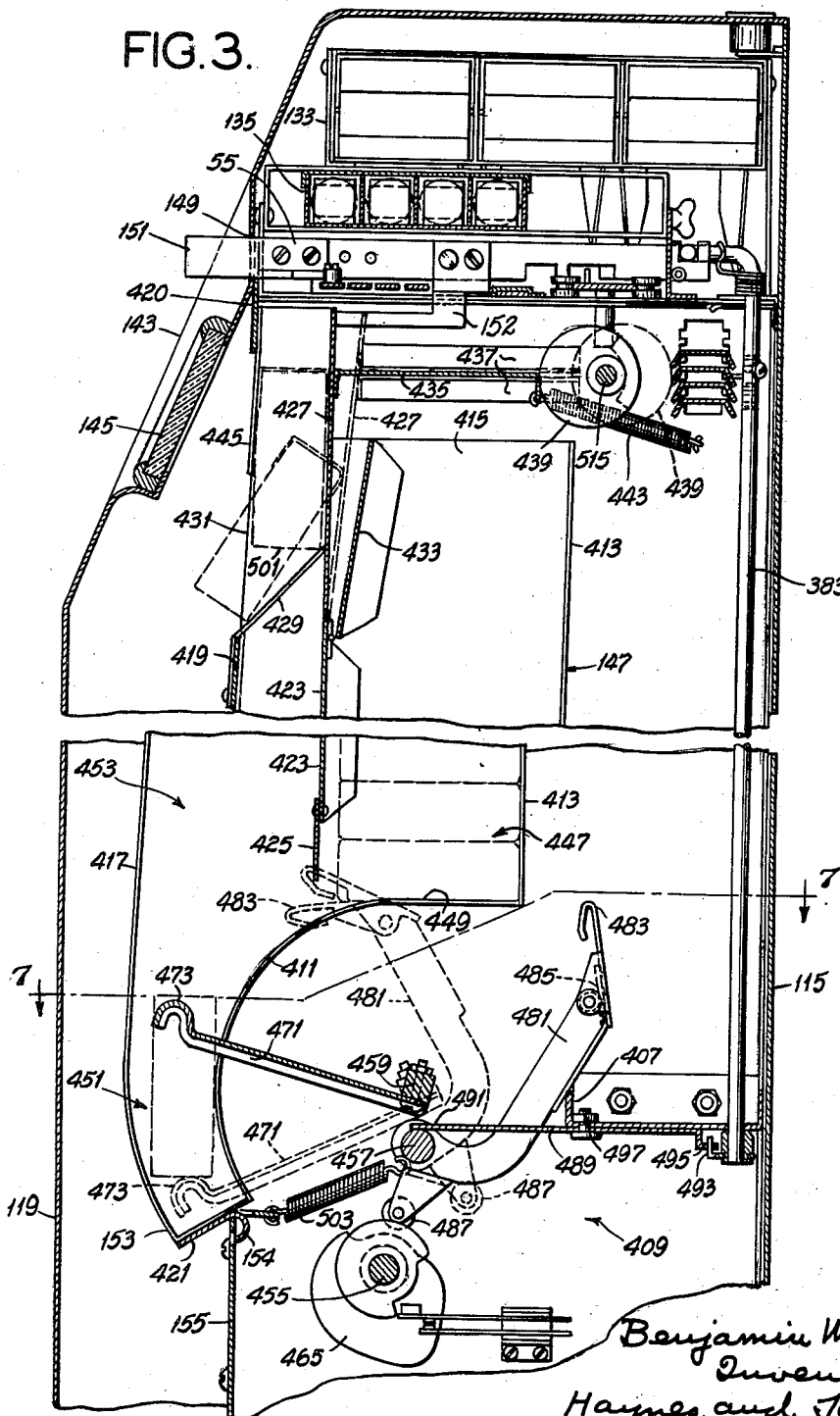
Fig. 3 is a vertical section taken on lines 3—3 of Fig. 1 and Fig. 7.
Figure 10:
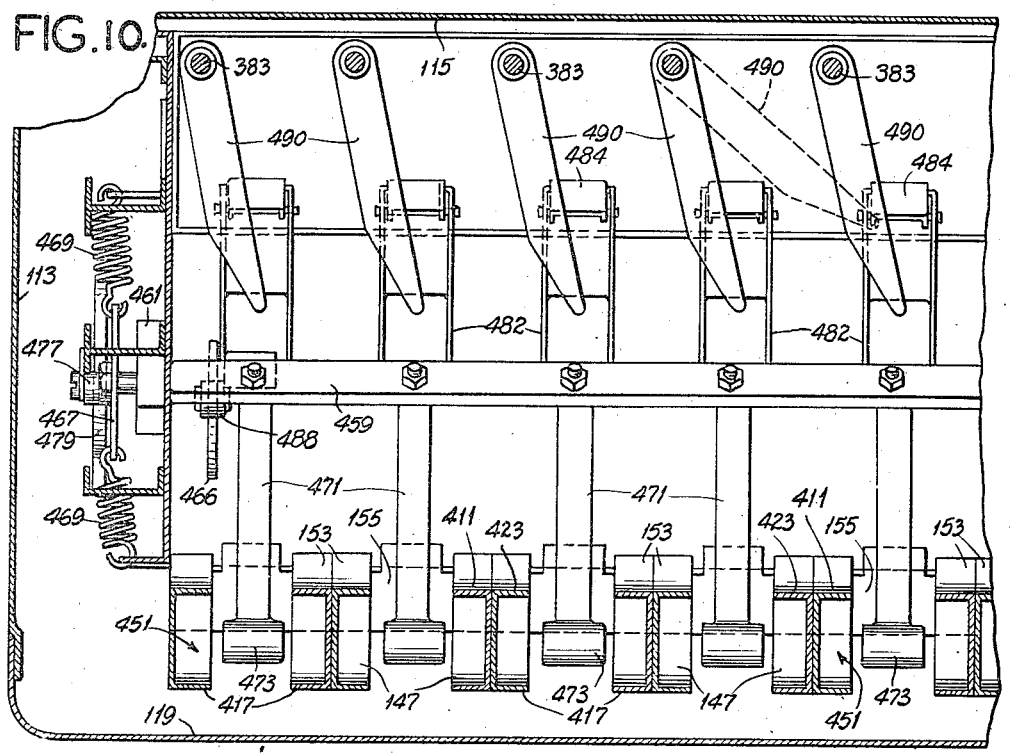
Fig. 10 is a fragmentary horizontal section similar to Fig. 7 but showing an alternative construction in respect to the delivery mechanism; and, Fig. 11 is a vertical section similar to the lower

2 portion of Fig. 3, but corresponding to the alternative construction of Fig. 10.

Similar reference characters indicate corresponding parts throughout the several views of the drawings.

Inasmuch as a description of much of the mechanical construction of the parent application is not necessary for a complete understanding of the divisional subject-matter herein presented, only that part which is necessary is described.

Referring now more particularly to Figs. 1 and 2, there are shown sides 113 and a back 116 supported upon a base 117. Hooked into the front of the base 117 is a front panel 119 which may pivot forward on a lower hook 154a, swinging as shown in dash lines in Fig. 2. The front panel carries on it a right-hand coin-return cup 111, a central package receiver 121, and at the left a match-book receiver 123. The cups 111, 121 and 123 are associated with suitable adjacent openings, through the panel 119. A coin inlet is indicated at 125 which receives the necessary pieces. Below the coin receiver 125 is a coin testing and counting unit T which is made along the lines of the testing and counting unit shown in my United States Patent 2,361,835, for Coin-controlled apparatus, but to be further described herein. Below the testing and counting unit T is a coin-receiving box 129 for good coins. This coin box receives only 5¢ and 10¢ pieces. All other unwanted coins pass into the coin cup 111. If desired, a coin selector may be employed between receiver 125 and unit T, but this is not shown, being an attachable item of any desired design which may be purchased for the purpose.

At 131 is shown a chute that passes from one end of a horizontal match container 133, to the match-delivery cup 123. Below the match container 133 is a horizontal penny change container 135 which sends pennies from the other end of the machine down a penny chute 137 and through a passage 139 and into the coin cup 111.

Behind the receiver 121 is a flaring delivery trough 141 which receives packages from a series of inner openings 431 across the width of the machine. This is for gravity feed to the central package-delivery cup 121.

Figure 5:
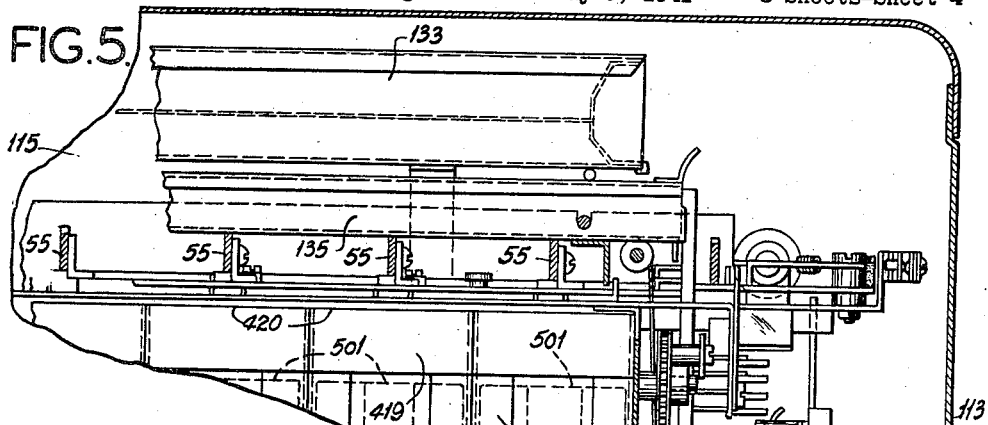
Fig. 5 is a vertical section taken on line 5—5 of Fig. 6.

The upper portion of the front panel 119 (Fig. 3) slopes back at 143 and is depressed, where it is provided with a long window 145 for viewing one each of various brands of packages in the openings 431, located for display at the upper ends of the individual supply chambers 147. Above the window 145 are openings 149 from which forwardly extend push buttons 151. These are located on push rods 55 extending rearward (see also Fig. 6). The push rods 55 are located under the horizontal penny container as shown in Fig. 3. The individual supply chambers 147 extend vertically and parallel as indicated in Figs. 3 and 5. At their lower ends 153, they have the hooks 154 in rotary engagement with the upper portion of a wall 155. They are movable forward for refilling and may also be removed, if desired. The wall 155 is at the lower portion of the machine and in this region is carried the delivery mechanism operative in conjunction with said supply chambers 147. This will later be described.

As mentioned in my United States Patent 2,238,725, for article delivery machine, it is made clear that vending apparatus of the type in which the articles are stored more or less beneath the operating parts, saves head room. In the present case, this so-called console type of cabinet is used. Various items such as selective bars, push rods, tumblers, match supply box, coin box and other parts are located more or less horizontally at the top of the machine, and underneath these and toward the front are stored the articles (Fig. 3). At the rear of the machine, the rods 383 are brought down to a lower bearing 407 and from these points control discharge operating mechanism indicated generally at 409. Each discharge mechanism 409 operates in association with a package container 147, one of which is shown in perspective in Fig. 9.

Each discharge compartment 147 (Figs. 3 and 9) consists of a rounded bottom 411, rear guides 413, sides 415 and front guides 417, joined by bars 419 and 420 at the top and by a bar 421 at the bottom. Guides 417 are notched to provide an opening 431, above which are short flanges 445.

The contained space is divided into two by a vertical wall 423, at the lower end of which is a light leaf spring 425 and at the upper end of which is hinged flap 427, which may swing forward and backward. From the front bar 419 extends a light leaf spring 429 which presses lightly against the lower end of the flap 427. Through the opening 431 between the side walls 415 and the bars 419 and 420 may be viewed the package which is to be delivered, the package being directly behind the window 145 and above the spring 429 (Fig. 3). Spring 429 is a trap door.

Each compartment 147 is rotary on lower hook 154 and may be angled forward for filling, or removed if necessary. At the top it has a rest 420.

Each flap 427 may lie back against a stop 433 but is normally pushed forward in alignment with the wall 423 (which spring 429 permits) by means of a horizontal pusher plate 435. Plate 435 is held in endwise guides 437 and may slide forward and backward under influence of two eccentric cams 439 on a cross shaft 515 (Fig. 8). The pusher plate 435 is biased against the eccentric 439 by means of a biasing spring 443. When the plate 435 is forward, the flap 427 is so related to the spring 429 and the pair of forwardly located flanges 445 that a package is held in a stationary vertical position with its rear bottom edge on the top edge of the spring 429 and its front edges held in by the abutment formed by the flanges 445. This presents it to view through the window 145.

Figure 9:
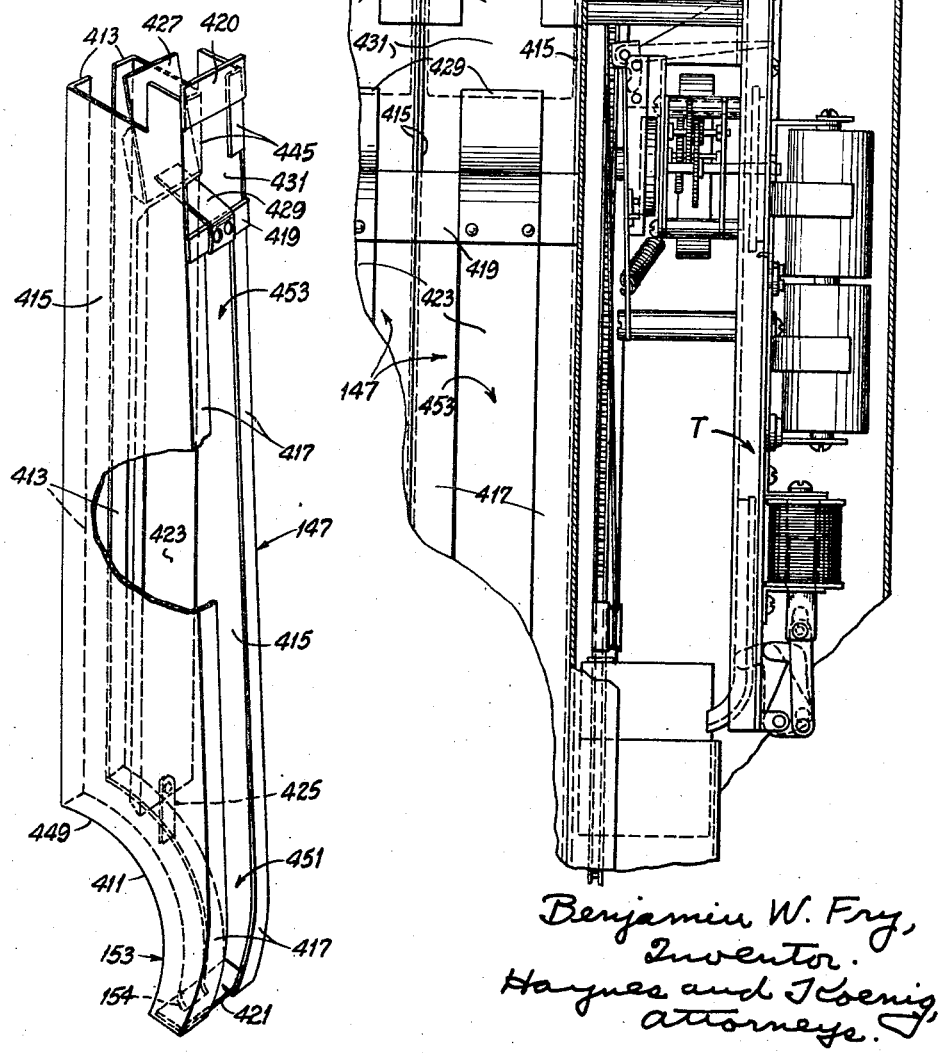
Fig. 9 is a perspective view of a vertical delivery chamber and chute removed from the machine.

It is the intention, as described in said parent Patent 2,377,413, that a package shall be released by angling back the respective flap 427 to the position shown in dotted lines in Fig. 3, and in solid lines in Figs. 8 and 9; whereupon the package may slip out of the opening 431 as indicated in the lower dotted lines in Fig. 3. Thus released, the package falls down into the sloping trough 141 and slides down to the delivery cup 121 (see also Figs. 1 and 2). Thus the purchaser obtains the very package that he sees through the window 145. As made clear in my parent Patent 2,377,413 and as shown in Fig. 3 herein each flap 427 is normally held forward by means of a horizontal pusher plate 435 and a finger 152. Plate 435 is held in endwise guides 437 and may slide forward and backward under influence of two eccentric cams 439 on cross shaft 515. The plate 435 is biased against an eccentric 439 by means of a biasing spring 443. When the plate 435 and fingers 152 are forward, the flaps 427 are so related to spring trap doors 429 and the pairs of flanges 445 that all packages are held in stationary vertical positions above trap doors 429. When plate 435 retracts under action of spring 443 and a finger 152 is pushed back, the respective package may angle as shown, to drop out of the respective opening 431. The shaft 515 is automatically operated upon pushing in a plunger 151 by means set forth in said Patent 2,377,413 but before a flap 427 may angle back, the finger 152 attached to the corresponding plunger 151 must be cleared, which clearing is accomplished whenever the respective plunger is pushed in. The actuation of one plunger 151 by initiating automatic action of shaft 515 causes the plate 435 to clear all flaps 427 but this particular plunger operation causes only the corresponding one of the fingers 152 to clear the corresponding flap 427. All other flaps 427 are held by the other fingers 152 on unmoved plungers 151. Also, as stated in the patent, all other plungers 151 are locked against operation when a given one is pushed. Hence all other fingers 152 lock in their respective flaps 427, thus preventing delivery of more than one package at a time.

A supply of horizontal packages 447 is stacked behind the wall 423 on a bottom portion 449. It is the purpose of the mechanism 409 to push the bottommost package from the supply 447 past the spring 425 down into a more or less vertical position in a pocket 451, from which it is flung up through the front compartment 453 and past the light spring 429, the spring functioning thereafter to act as a support as long as the flap 427 is in forward position. Thus spring 429 functions in association with the flanges 445 and flap 427 as a trap and the next package is thus presented to view for a subsequent delivery after it has been flung up.

Figure 4:
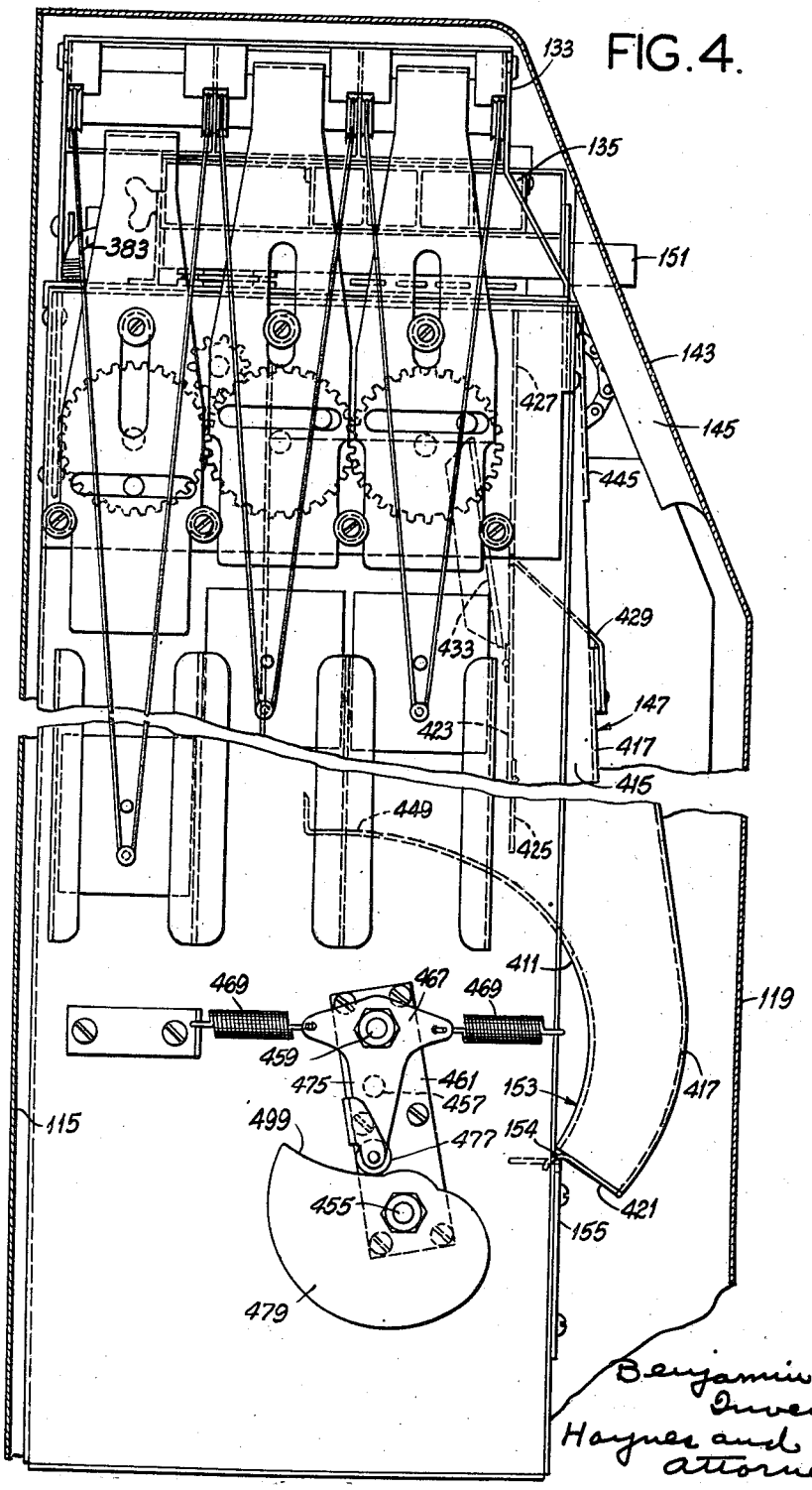
Fig. 4 is a vertical section taken on line 4—4 of Fig. 1.

The delivery mechanisms 409 consist of three cross shafts 455, 457 and 459, held in lateral bearing blocks 461. Shaft 455 turns and is driven by a gear train 463 from the delivery motor J. This shaft 455 carries a group of interior cams 465. The shaft 457 is stationary. Shaft 459 is oscillating and carries centering devices 467 on opposite ends normally held horizontal by springs 469 (Fig. 4). Thus the shaft 459 is normally held in the upper solid-line position shown in Fig. 3 wherein elevators 471 are up. The ends 473 of the elevators 471 swing in the lower pocket 451 between flanges 417. To temporarily force the elevators down to the dotted line positions shown in Fig. 3, there is provided at one end of the shaft 459 a lever 475 carrying a follower roller 477 driven by a cam 479 (Fig. 4). One revolution of the cam 479 results in depressing the pushers 473 (dotted lines, Fig. 3) and then suddenly releasing them from the dotted line to the solid line position of Fig. 3, under action of the centering springs 469. This provides a snap-action for package elevation past spring 429.

In order to push packages from the supply column 447 onto depressed elevators 473 as the elevators are depressed, there are provided rocker arms 481 which slide and rotate individually on the stationary shaft 457. Each rocker 481 is provided at its upper end with a retractable pusher finger 483 biased upward by a spring 485. Thus as a finger 483 advances to the lowermost one of the supply packages 447 it will push it out past the spring 425 and into the lower dotted line position shown in Fig. 3, onto the corresponding elevator 471 which is at time depressed. When the pusher arm 481 swings back (clockwise in Fig. 3) the finger 483 rotates against bias of spring 485 underneath the next descended package 447. This descended package in supply 447 cannot move backward because of the rearward flanges 413 which hold it. Each rocker arm 481 is operated from an attached follower 487 which in turn is operated by an adjacent cam 465 on said shaft 455. Each revolution of the respective cam 465 causes one oscillation of the rocker arm 481. Cams 479 and 465 are timed so that upon downward movement of 471, an arm 481 moves forward; and upon retraction of an arm 481 elevator 471 flips up the package which has been pushed onto it.

Figure 7:
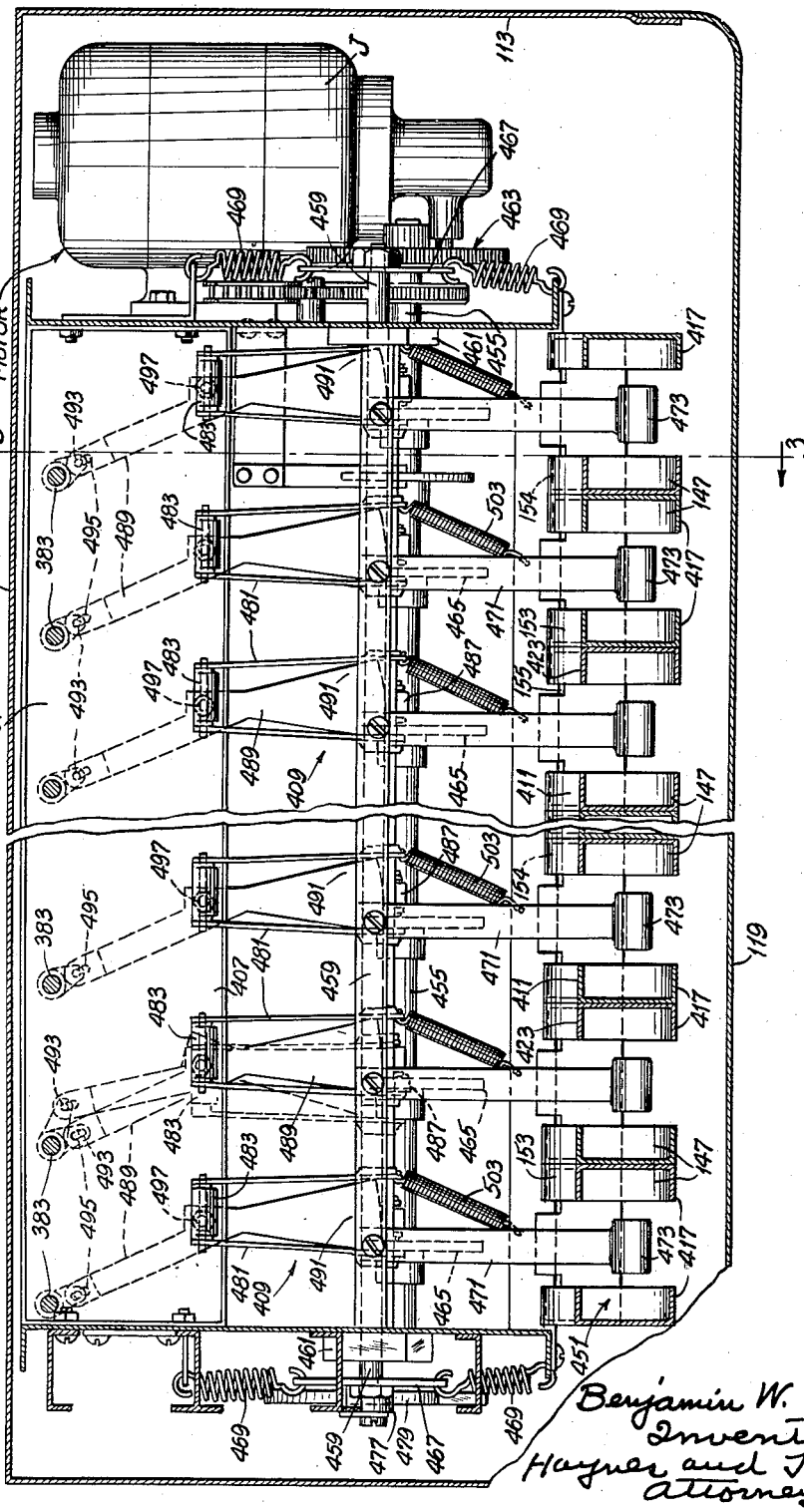
Fig. 7 is a horizontal section taken on line 7—7 of Figs. 1 and 3.

Since it is desired to have only one rocker arm 481 operate in accordance with a purchaser's selection, each vertical rod 383 couples in the respective rocker 481 for operation (Figs. 3, 7 and 8). This is done by providing a shifter bar 489 for each rocker arm 481, adjacent bars being arranged to be non-planar to avoid interference. It will be seen from Fig. 7 that each rocker 481 is shaped like a bail, and the outer ends of shifters 489 are within the bottom portions of these bails, as indicated at 491 in Figs. 3 and 7. To operate each shifter bar, each rod 383 is provided at its lower end with a pin 493 operating in a slot 495 of the respective shifter bar 489. Thus each shifter is pivoted at 497 and is under rotary control of the rotary motion of the respective vertical rod 383. Hence, when a purchaser pushes in a button 151 to operate a push rod 55, the respective rod 383 is rotated counterclockwise (Figs. 6, 7 and 8) thus to rotate the respective shifter bar 489 clockwise and to carry the respective follower 487 into position above and for engagement with the respective cam 465. Therefore, upon rotation of the cam shaft 455, the particular rocker 481 for replenishing the particular kind of package that was delivered upon purchase becomes operable. As a package is being pushed out from the supply 447, the respective elevator 471 descends to receive it. Then the rocker 481 moves back and the cam 479 is so timed that the elevator flips up suddenly (see the quick-return surface 499 on cam 479) to send the package up the passage 453 past the spring 429 and into the position formerly occupied by the purchased package. Since the flap 427 at this time is vertical, the package is held as shown at 501. The rocker arms 481 are normally spring-returned against the member 407 by means of springs 503.

Figure 11:
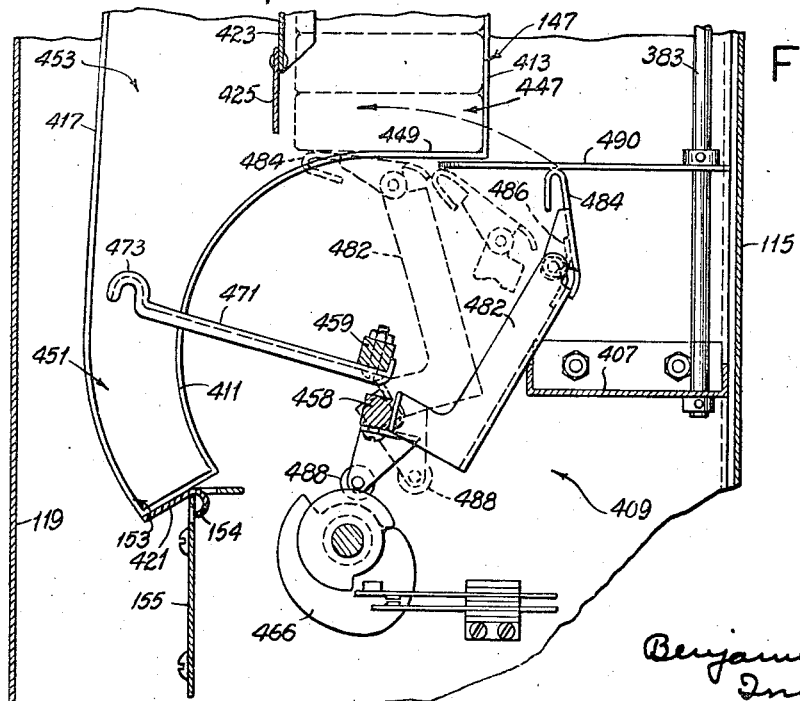

An alternate delivery scheme is shown in Figs. 10 and 11. If desired, the cams 465 may be eliminated by providing only one cam 466 (like cams 465) and causing this to operate a follower 488 which however is attached directly to shaft 458 which is equivalent to shaft 457 of Fig. 3. In this case, shaft 458 is made square in order to provide ready means for attachment of various parts.

On this shaft 458 is a plurality of rocker arms 482 having pusher fingers 484 upwardly biased by springs 486. Upward bias of the respective pusher fingers 484 is prevented when desired by mask plates 490 which oscillate in a horizontal plane on the respective vertical rods 383. The normal position of each mask plate 490 is in masking position, as shown in Fig. 11, wherein, upon oscillation of the shaft 458 from cam 466 the finger 484 is depressed to prevent it from pushing from behind the lowermost package of supply 447. Whenever a purchaser pushes in one of the push buttons 151 and the corresponding push rod 55, the respective shaft 383 is rotated counterclockwise to clear the respective mask plate 490 from the respective finger 484, thus to permit the finger to bias up upon forward movement to push out a package in the corresponding supply compartment.

To load the machine, the front panel 119 is unlocked and swung forward, as indicated in Fig. 2. The magazines 147 are rotated forward on their hooks 154 and are filled. They may be entirely removed, if desired, as may be the panel 119. A package is also placed above the spring 429 behind each opening 431. This package is manually held in this position until the magazine has been swung back to a position wherein the package is held by flap 427. When the magazine 147 is rotated back into the machine as shown in Fig. 3, the flap 427 is forced into forward position to hold the uppermost package 501 in view behind the window 145, a supply 447 being behind the wall 423, as indicated in Fig. 3. In its upright position the magazine gravitates clockwise so that the lip 420 rests against the front of the upper interior elements of the machine (Fig. 3). The lip is there positively held by the panel 119 when the latter is closed. The brands are arranged as desired in the respective magazines, according to cost which is appropriately marked on or near buttons 151.

Just after the purchased package falls clear of the opening 431, the package delivery mechanism operates to move the elevator 473 to flip up a package vertically past the spring 429 into position 501 at which time the flap 427 has returned so that the package may not follow out after the purchased package, but remains in visible position under the window 145. This also has the effect that after a purchaser has bought the last package, no further package flips into position, and a purchaser is automatically advised not to insert money for a package when none is there.

The machine has a great capacity for packages in a very compact space, requiring little head room, since all package delivery is from below. There is practically no waste space within the console case. It will carry 400 cigarette packages.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a vending machine, article delivery means comprising means for maintaining a stack of articles, oscillating means for withdrawing an article from the bottom of the stack, a follower associated with the oscillating means, a cam intermittently driving the follower, said follower and cam normally being out of alignment for non-operation, a push rod, and a linkage connecting the push rod and the oscillating means adapted to shift said oscillating means into position to align said follower with said cam, whereby oscillation and article withdrawal will occur upon cam movement.

2. In a vending machine, article delivery means comprising means for maintaining a stack of articles, oscillating means for withdrawing an article from the bottom of the stack, a follower associated with the oscillating means, a cam driving the follower to cause oscillation, a biased pusher on the oscillating means engageable under bias with a bottom-most article to push it out of position upon forward movement but adapted to be biased under the next article upon reverse movement, a mask plate, and means for moving said mask plate into position to bias said pusher to prevent article delivery upon forward movement.

3. In a vending machine, means for maintaining a plurality of vertical stacks of articles, means for withdrawing articles respectively from the bottoms of the stacks, comprising a plurality of oscillating members oscillating together, biased pusher fingers on the oscillating members normally pressed toward a position to engage a package to move the same from the bottom of its respective stack upon a forward stroke, but adapted upon a rearward stroke to bias under the next article without removal, a plurality of movable mask plates normally positioned to hold said fingers against their biases to prevent article removal upon a forward stroke, and selectively operable means for moving the respective mask plates out of masking position whereby only a selected finger may move to article ejecting position during oscillation.

4. In a vending machine, article delivery means comprising means forming a discharge channel, means for moving articles up against gravity in said channel toward its upper end, a trap door admitting upward movement of articles but preventing complete return movement, said channel having an outlet opening above said trap door, an abutment above said opening, and a movable back behind said opening having a closed and an open position, said back in its closed position, said abutment and said trap door acting to hold an elevated article and to present it to view at said opening, said back when open releasing the article to be discharged above the trap door from said opening.

5. In a vending machine, article delivery means comprising means forming a plurality of discharge channels, means for moving articles up against gravity in said channels toward their upper ends, trap doors respectively in the channels admitting upward movements of articles but preventing complete return movements, said channels having outlet openings above said trap doors, an abutment above each said opening, a movable back on each channel behind its discharge opening having a closed and an open position, each back in its closed position, the respective abutment and its respective trap door acting to hold an elevated article, said respective back when open releasing the respective article to be discharged from said opening, a plurality of manually operable plungers for selectively initiating package delivery, means on each manually operable plunger for normally holding shut a respective back but allowing the back to open when the plunger is pushed, reciprocating automatic means normally holding all backs in package holding positions but automatically movable to package releasing positions for all backs after one of the manually operable plungers is operated, said manually operated plunger only releasing the respective back for package release through a respective opening.

6. In a vending machine, article delivery means comprising means forming a plurality of discharge channels, spring trap doors respectively in the channels admitting articles but preventing return movement, said channels having outlet openings above said trap doors, an abutment above each said opening, and a movable back on each channel behind its said opening having a closed and an open position, each back in its closed position acting with its respective trap door and abutment to hold an elevated article and to present it to view at said opening, said respective back when open releasing the respective article to be discharged from said opening.

7. In a vending machine, article delivery means comprising means forming a plurality of discharge channels, spring trap doors respectively in the channels admitting articles but preventing return movement, said channels having outlet openings above said trap doors, an abutment above each said opening, a movable back on each channel behind its said opening having a closed and an open position, each back in its closed position acting with its respective trap door and abutment to hold an elevated article and to present it to view at said opening, said respective back when open releasing the respective article to be discharged from said opening, a plurality of manually operable plungers for selectively initiating package delivery, means on each manually operable plunger for normally holding shut a respective back, reciprocating means normally holding all backs in package holding positions but automatically movable to package releasing positions for all backs after one of the manually operable plungers is operated, only said manually operated plunger releasing its particular back for package release through said opening.

8. In a vending machine, a magazine, said magazine comprising a vertical storage channel for packages, a vertical delivery channel adjacent the storage channel, a lower connection between channels for movement of packages from the storage channel to the delivery channel, a package trap door at the upper end of the delivery channel permitting upward movement of packages but blocking complete downward movement, said magazine having an outlet opening above the trap door and an abutment above said opening, a flap beside the trap door and behind the opening, said flap having an open and a closed position with respect to the delivery channel and when closed acting with the trap door and abutment to hold packages and when open acting with the trap door to direct packages through said opening above the trap door.

9. In a vending machine, a magazine comprising a vertical delivery channel, a package trap door spring at the upper end of the delivery channel permitting upward movement of packages but blocking complete downward movement, said magazine having an outlet opening above the trap door spring and an abutment above said opening, a flap beside the trap door spring and behind the opening, said flap having an open and a closed position with respect to the delivery channel and when closed acting with the trap door spring and abutment to hold up packages and when open acting with the trap door spring to direct packages through said opening above the trap door spring.

10. In a vending machine, a magazine, said magazine comprising a vertical storage channel for packages, a vertical delivery channel adjacent the storage channel, a lower connection between channels for movement of packages from the storage channel to the delivery channel, a package trap door at the upper end of the delivery channel permitting upward movement of packages but blocking complete downward movement, said magazine having an outlet opening above the trap door and an abutment above said opening, a flap beside the trap door and behind the opening, said flap having an open and a closed position with respect to the delivery channel and when closed acting with the trap door and abutment to hold packages and when open acting with the trap door to direct packages through said opening above the trap door, a manual control member, means responsive to manual operation of said control member to move said flap to open position in order to release a package and then back to closed position, and additional means responsive to manual operation of said control member to move a package from the bottom of the storage channel through said connection to said delivery channel and to throw said package upward through the delivery channel to a point above the trap door whereat it is held by said closed flap, trap door and abutment.

11. In a vending machine, a magazine having a delivery channel, a package trap door at the end of the delivery channel permitting movement of packages through the trap door but blocking reverse movement, said magazine having an outlet opening above the trap door and an abutment above said opening, a flap associated with the trap door and behind the opening, said flap having an open and a closed position with respect to the delivery channel and when closed cooperating with the trap door and abutment to hold packages and when open cooperating with the trap door to drop packages through said opening above the trap door, a manual control member, and means responsive to manual operation of said control member to move the flap to open position in order to release a package and then back to closed position, and additional means responsive to manual operation of said control member to move a package through the delivery channel to a point above the trap door whereat it is held by said closed flap, trap door and abutment.

BENJAMIN W. FRY.